(12) United States Patent
Hillel

(10) Patent No.: US 6,325,168 B1
(45) Date of Patent: Dec. 4, 2001

(54) LIFT TRANSIT VEHICLE

(76) Inventor: Hillel Hillel, 21 Moshav Kidron, Moshav Kidron 70750 (IL)

( * ) Notice: Subject to any disclaimer, the term of this patent is extended or adjusted under 35 U.S.C. 154(b) by 0 days.

(21) Appl. No.: 09/508,733

(22) PCT Filed: Sep. 16, 1998

(86) PCT No.: PCT/IL98/00449

§ 371 Date: May 9, 2000

§ 102(e) Date: May 9, 2000

(87) PCT Pub. No.: WO99/14105

PCT Pub. Date: Mar. 25, 1999

(30) Foreign Application Priority Data

Sep. 16, 1997 (IL) ......................................................... 121798

(51) Int. Cl.$^7$ ..................................................... B60D 7/14
(52) U.S. Cl. ...................... 180/14.1; 180/65.1; 180/908
(58) Field of Search ................. 180/11, 12, 65.1, 180/65.6, 907, 908, 14.1, 14.2; 280/33.991, 33.992, 33.996, 33.997, 250.1, 304.1; 414/334, 685, 467, 468, 469, 539, 540, 545, 921

(56) References Cited

U.S. PATENT DOCUMENTS

| | | |
|---|---|---|
| 3,912,032 * | 10/1975 | Benz et al. . |
| 3,921,740 | 11/1975 | Forster . |
| 4,076,268 * | 2/1978 | Hart . |
| 4,096,920 | 6/1978 | Heyn . |
| 4,155,678 | 5/1979 | Lehman . |
| 4,518,057 | 5/1985 | McCallum . |
| 4,573,854 | 3/1986 | Mcfarland . |
| 4,580,652 * | 4/1986 | Turner et al. ........................ 180/11 X |
| 4,592,695 * | 6/1986 | McConnell . |
| 4,679,807 * | 7/1987 | Raybon ................................ 180/907 |
| 4,695,071 * | 9/1987 | Johnston . |
| 4,738,581 * | 4/1988 | Kuhlman .......................... 414/921 X |
| 4,771,840 | 9/1988 | Keller . |
| 4,786,072 * | 11/1988 | Girvin ............................... 414/921 X |
| 4,830,567 | 5/1989 | Rachman . |
| 4,898,508 | 2/1990 | Hayata . |
| 4,986,387 * | 1/1991 | Thompson et al. . |
| 5,064,209 * | 11/1991 | Kurschat ....................... 280/250.1 X |
| 5,082,074 | 1/1992 | Fischer . |
| 5,207,286 * | 5/1993 | McKelvey ....................... 180/907 X |
| 5,293,950 | 3/1994 | Marliac . |
| 5,439,069 | 8/1995 | Beeler . |

FOREIGN PATENT DOCUMENTS

| | | |
|---|---|---|
| 3708117 * | 9/1988 | (DE) . |
| 4305592 * | 9/1993 | (DE) . |
| 249709 * | 12/1987 | (EP) . |
| 300340 * | 1/1989 | (EP) . |
| 390431 | 3/1990 | (EP) . |
| 2110997 | 6/1983 | (GB) . |

* cited by examiner

Primary Examiner—Brian L. Johnson
Assistant Examiner—Bryan Fischmann
(74) Attorney, Agent, or Firm—Shalom Wertberger; Saltamar Innovations

(57) ABSTRACT

A transit vehicle for transporting an object (22) having a plurality of ground-interfacing wheels (24, 25), comprising a lift mechanism adapted to lift and grip a portion of the object such that the object is maintained at a lifted transit position in which all of the ground-interfacing wheels do not engage the ground. In a preferable embodiment the lift mechanism comprises a piston-cylinder unit (51) that is mounted on the chassis of the transit vehicle and is operated to retractably move at least one freely rotatable support wheel (18). In another embodiment the lift mechanism comprises a grip mechanism comprised of at least one horizontal extendible bar (37).

8 Claims, 4 Drawing Sheets

LIFT TRANSIT VEHICLE

TECHNICAL FIELD

The present invention relates to light-weight transport devices in general and, more particularly, to vehicles for transporting wheeled objects.

BACKGROUND ART

Devices for hauling, pushing or transporting wheeled objects are well known in the art. Such known devices include, for example, the following:

U.S. Pat. No. 5,082,074 describes a U-shaped, one-wheeled, motorized device for mounting to the back of a shopping cart. The U-shaped device provides motor-assisted motion of the shopping cart.

U.S. Pat. No. 4,771,840 describes an articulated shopping cart-tractor unit with a seat, especially suitable for a handicapped shopper. The tractor unit is connected to a conventional shopping cart by a bracket and coupling arrangement.

U.S. Pat. No. 5,439,069 describes a powered pusher vehicle for moving a train of nested shopping carts, the vehicle has a central drive wheel and caster wheels which balance the vehicle and provide steering and manipulation capability.

U.S. Pat. No. 4,096,920 describes a self-propelled shopping cart having a trailer for transporting a passenger standing behind the cart. The self-propelled cart can also be used as a conventional shopping cart by tilting the trailer to an upright position.

In all the prior art devices describes above, the cart is transported such that all of its wheels, e.g. 4 wheels, are in contact with the ground, in analogy to manual transportation of the cart. It should be noted that although the wheels of the cart support the weight of the cart, these wheels generally impair the steering and manipulation capability of the device during transportation of the cart.

Wheelchairs are commonly used for transporting patients in health-care related facilities such as hospitals, clinics and medical centers. It is appreciated that the personnel of the health-care facility transport patients manually over long distances and, occasionally, the patients are transported up or down slopes. This imposes an undue burden on the personal of health-care facilities.

DISCLOSURE OF INVENTION

The present invention seeks to provide a powered transit vehicle for conveniently and safely transporting a wheeled object. According to some aspects of the present invention, the wheeled object is transported while carrying a person. In one preferred embodiment of the present invention, the wheeled object is a wheelchair accommodating a person to be transported. Thus, the transit vehicle of the present invention can be used, inter alia, for transporting patients between locations in health-care facilities, e.g. hospitals, clinics, mental institutions or geriatric facilities. The present invention is also useful in "homes" for the elderly and/or the disabled.

It is an object of some aspects of the present invention to provide a transit vehicle for transporting a multi-wheeled object such that all of the wheels of the object disengage the ground. In some preferred embodiments of the present invention, the wheeled object is a manual advancement device such as a wheelchair. In other preferred embodiments of the invention, the wheeled object is a wheeled carrier, such as a shopping cart.

In a preferred embodiment of the present invention, the transit vehicle includes a lift mechanism adapted to maintain the wheeled object at a lifted transit position in which all of the wheels of the object do not engage the ground. Preferably, the lift mechanism first grips a portion of the wheeled object and then, once the wheeled object is securely gripped, the lift mechanism lifts the wheeled object to the transit position. The wheeled object is thus transported in the lifted, transit position which enables convenient and safe transportation of the object to a desired location.

There is thus provided, in accordance with a preferred embodiment of the present invention, a transit vehicle for transporting an object having a plurality of ground-interfacing wheels, the vehicle including a lift mechanism adapted to lift and securely grip a portion of the wheeled object such that the object is maintained at a lifted, transit position in which all the ground-interfacing wheels of the object do not engage the ground.

In a preferred embodiment of the present invention, the transit vehicle includes at least one driving wheel engaging the ground and at least one motor which powers the at least one driving wheel.

In a preferred embodiment of the present invention, the object includes a rigid support structure and the lift mechanism is adapted to grip at least one segment of the rigid support structure.

Preferably, the lift mechanism comprises a piston-cylinder unit that is mounted on the chassis of the transit vehicle and is operated to retractably move at least one freely rotatable support wheel, at least one connecting rod is hinged to the chassis on the one hand and to the at least one support wheel on the other end, so that the moving forward and the retracting of the at least one support wheel by means of the piston cylinder unit tilts up or down, respectively, the front part of the chassis and lifts or lowers, respectively the object. Further preferably, lifting platforms on which wheels of the object are placed during the lift of the object, are included in the lift mechanism. Optionally, the lift mechanism may include a frontal extending guide arch or arms that extend forward to provide guiding, stop and support means to the object.

In a preferred embodiment, the lift mechanism comprises a grip mechanism, the grip mechanism comprises at least one horizontal extendible bar that may be retractably extended toward the side into a gripping position adapted to securely grip respective niche or aperture of the support structure of the object. The niche or aperture may includes a connection comer between poles and beams of the support structure.

Preferably, the bar is reciprocated through a guiding sleeve that is attached to the chassis of the transit vehicle, and the grip mechanism further comprises spring means for keeping the bar in a retracted configuration, and a spacer which is selectively forced to urge the bar to extend to the side, by manual means or a piston cylinder unit. Further preferably, the grip mechanism comprises two horizontal extendible bars that may be retractably extended toward the opposed sides.

In some preferred embodiments of the present invention, the object includes a wheelchair. Preferably, the wheelchair includes a collapsible wheelchair.

BRIEF DESCRIPTION OF DRAWINGS

The present invention will be better understood from the following detailed description of preferred embodiments of the invention, taken in conjunction with the ramp following drawings in which.

BEST MODE FOR CARRYING OUT THE INVENTION

Figure 1:
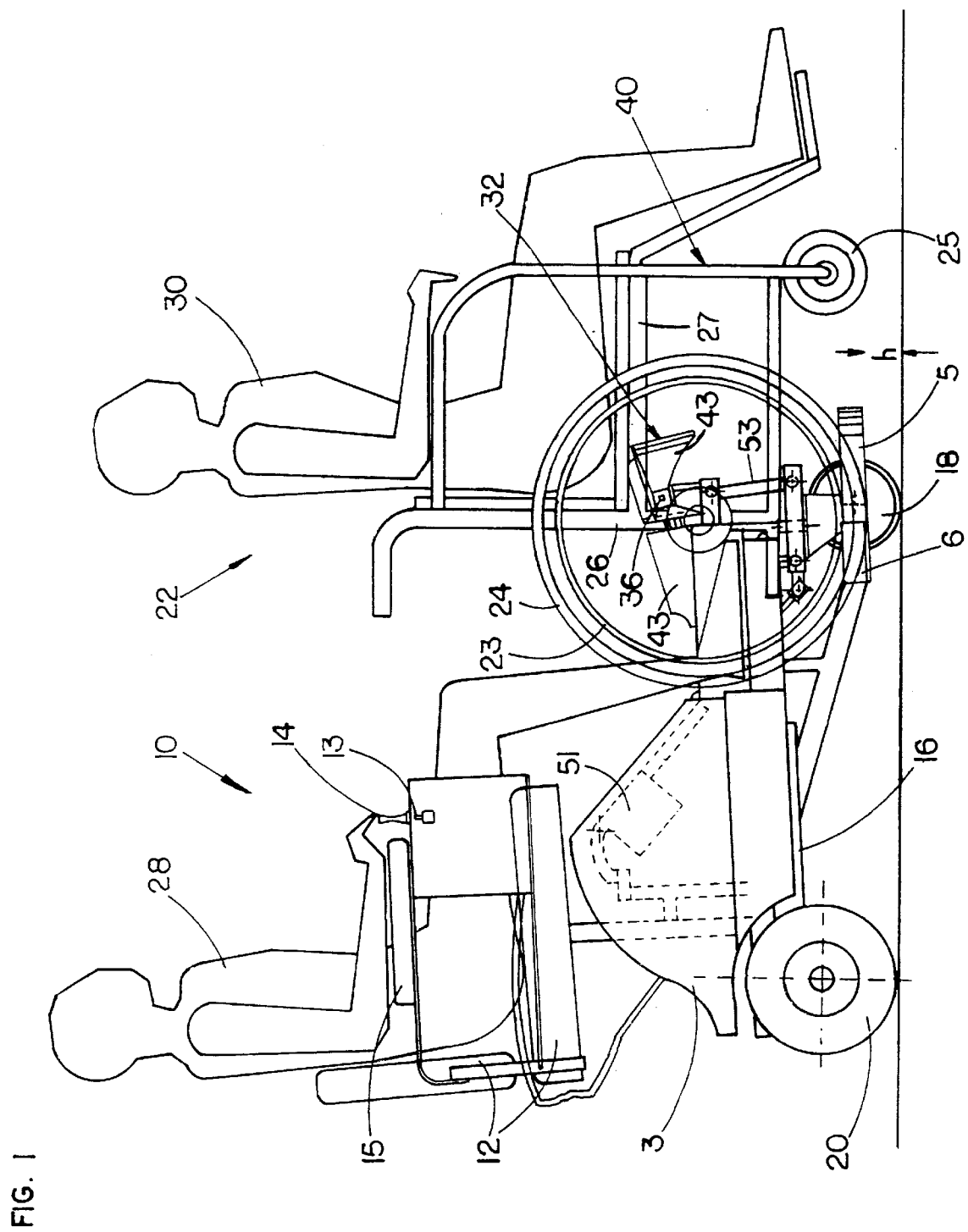
FIG. 1 is a side view, schematic illustration a transit vehicle in accordance with a preferred embodiment of the present invention transporting a wheelchair accommodating a person.
Figure 2:
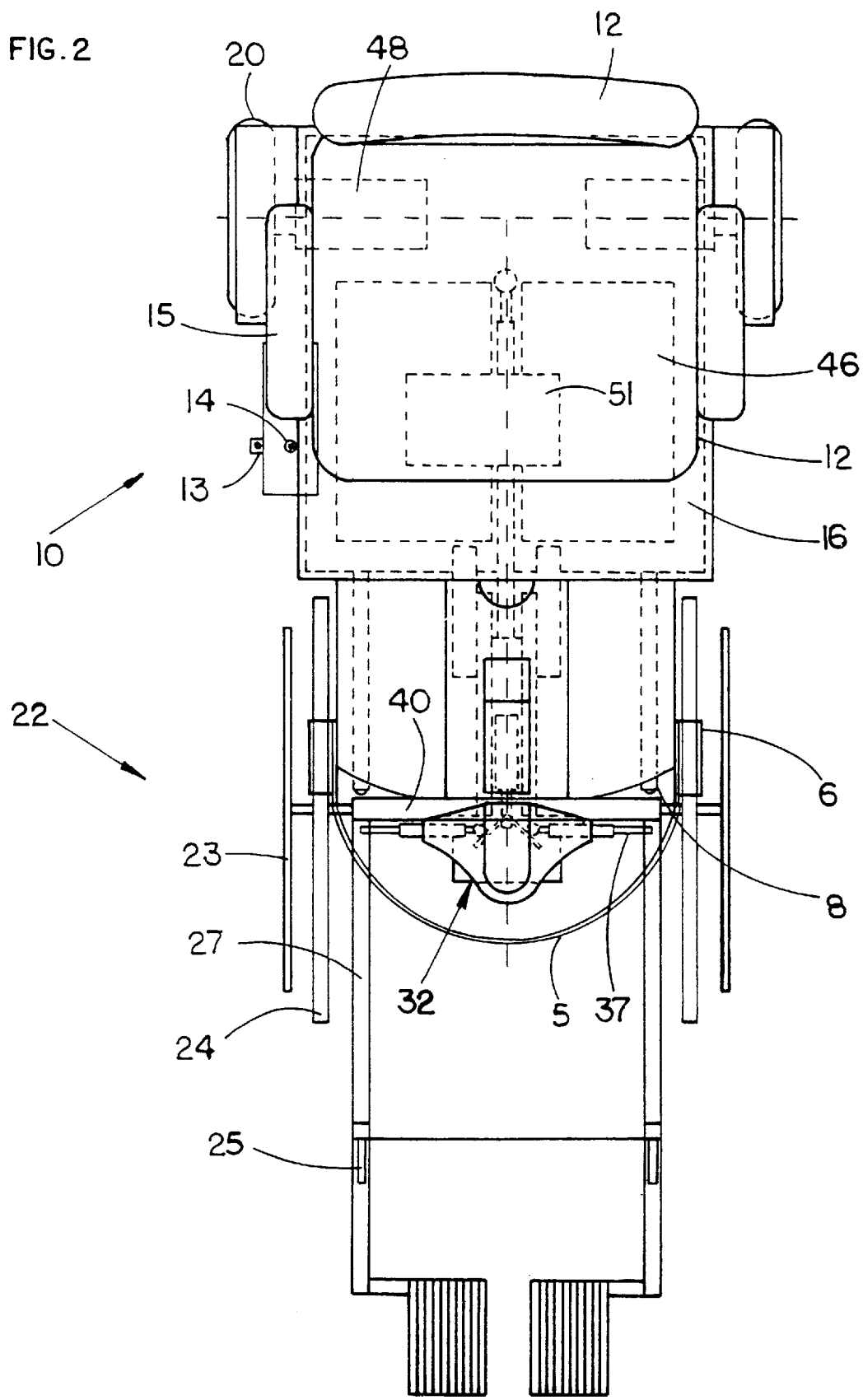
FIG. 2 is a top view, partly cutaway, schematic illustration of the transit vehicle and wheelchair of FIG. 1.

Reference is now made to FIG. 1, which schematically illustrates a side view of a transit vehicle 10, constructed and operative in accordance with a preferred embodiment of the present invention, transporting a wheelchair 22 accommodating a person 30, for example a patient at a hospital. Reference is also made to FIG. 2 which schematically illustrates a partly cutaway top view of transit vehicle 10 and wheelchair 22 and to FIGS. 3–6, wherein like parts are denoted with like numerals. Transit vehicle 10 is driven by a person 28 (FIG. 1), for example a hospital attendant or orderly, who is seated on a seat 12 and operates the vehicle using hand controls 14 on arm rests 15 of seat 12. As shown in FIG. 1, the height of seat 12 is preferably designed such that person 28 will have a clear view above person 30. In some preferred embodiments of the present invention, vehicle 10 is additionally or alternatively provided with foot controls (not shown), for example foot pedals, which control at least some of the functions of vehicle 10 as described below.

Vehicle 10 is preferably powered by motors 48 (FIG. 2), preferably electric motors as are known in the art, which rotate driving wheels 20 in response to the position of controls 14. Motors 48, which are preferably mounted on chassis 16 of vehicle 10, are preferably associated with wheels 20 via appropriate transmissions (not shown), for example planetary transmissions, as are known in the art. Each motor 48 is preferably associated with an appropriate breaking means (not shown), for example an internal electro-break mechanism as is known in the art, which is preferably activated via controls 14. In a preferred embodiment of the present invention, motor 48, the transmission and the breaking mechanism are all embodied in a single driving unit, for example the electric motor units which are available from Silver Leader, Taiwan.

Electric power to motors 48 is provided by batteries 46, preferably including rechargeable batteries as are known in the art, which are mounted on chassis 16 under seat 12, as shown in FIGS. 1–6. In one preferred embodiment of the present invention batteries 46 include four 12-Volt batteries of the type used on automobiles, at least two of which batteries are connected in series to supply a voltage of 24 volts as preferably required by motors 48. Preferably, only two of the four batteries 46 are used at any given time, while the other two batteries are reserved as back-up batteries to be used when the power of the used batteries drops below a predetermined threshold level.

Steering capability may be provided to vehicle 10 by virtue of separate control of motors 48 using controls 14, as is known in the art. Steering of vehicle 10 is preferably assisted by a front wheel 18 which is preferably mounted on a rotatable wheel-support 19 which freely rotates on an axle 17. In an alternative, preferred, embodiment of the present invention, axle 17 is replaced by an angular positioner and steering is effected by controlling the angular position of wheel-support 19 using the angular positioner. Such an angular positioner may include an electric motor which is powered by batteries 46 and controlled by driver 28 using control 14.

Wheelchair 22 may include any wheelchair known in the art, preferably a collapsible wheelchair of the type commonly used in hospitals, comprising a support structure 40, manual-advance wheels 24 and maneuvering wheels 25. Manual-advance wheels 24 are preferably provided with circumferential handles 23 as is well known in the art. Support structure 40 includes, inter alia, a pair of vertical support poles 26 and a pair of horizontal support beams 27 which are utilized by the present invention as described in detail below.

In accordance with the present invention, transit vehicle 10 includes at least one lift mechanism 31, described in detail below, which is adapted to securely grip at least one, respective, segment of support structure 40 in a slightly lifted, transit, position. In a preferred embodiment of the present invention, lift mechanism 31 includes two grip mechanisms 32, one for each side of support structure 40 at the connection corners between poles 26 and beams 27, respectively. In the lifted transit position, as shown particularly in FIGS. 1, 5 and 6, maneuvering wheels 25 of wheelchair 22 are disengaged from the ground as well as manual-advance wheels 24. In the lifted position, wheels 24 and 25 are preferably separated from the ground by a height h, sufficient to maintain wheels 24 and 25 above small objects and/or bumps along the transportation path. Thus, wheelchair 22 bearing person 30 can be easily transported to a desired location, while the weight of wheelchair 22 with person 30 is wholly supported by vehicle 10. Since the load of person 30 and wheelchair 22 is carried by vehicle 10, and since the weight of driver 28 approximately balances the weight of person 30, vehicle 10 can be a light-weight vehicle having a low power consumption. Preferably, the total weight of vehicle 10, including batteries 46 but not including person 28, is on the order of 150 kilograms.

Figure 3:
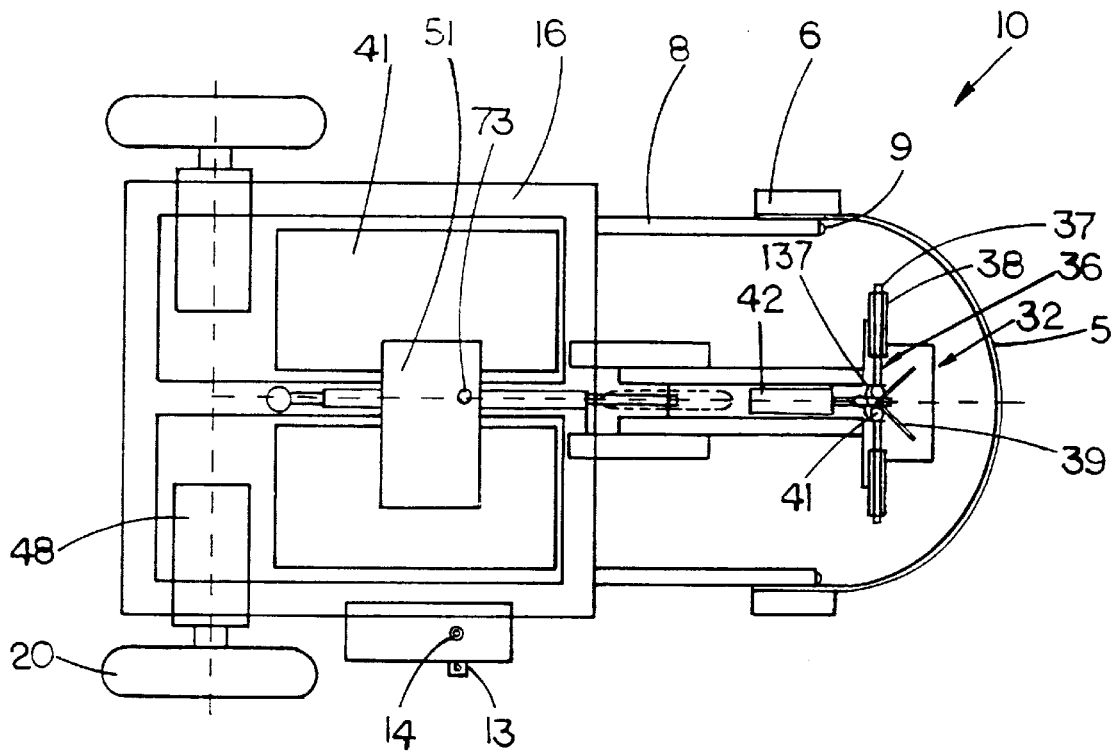
FIG. 3 is a top view, partly cutaway, schematic illustration of the transit vehicle of FIG. 1, in a lowered position before gripping the wheelchair.
Figure 4:
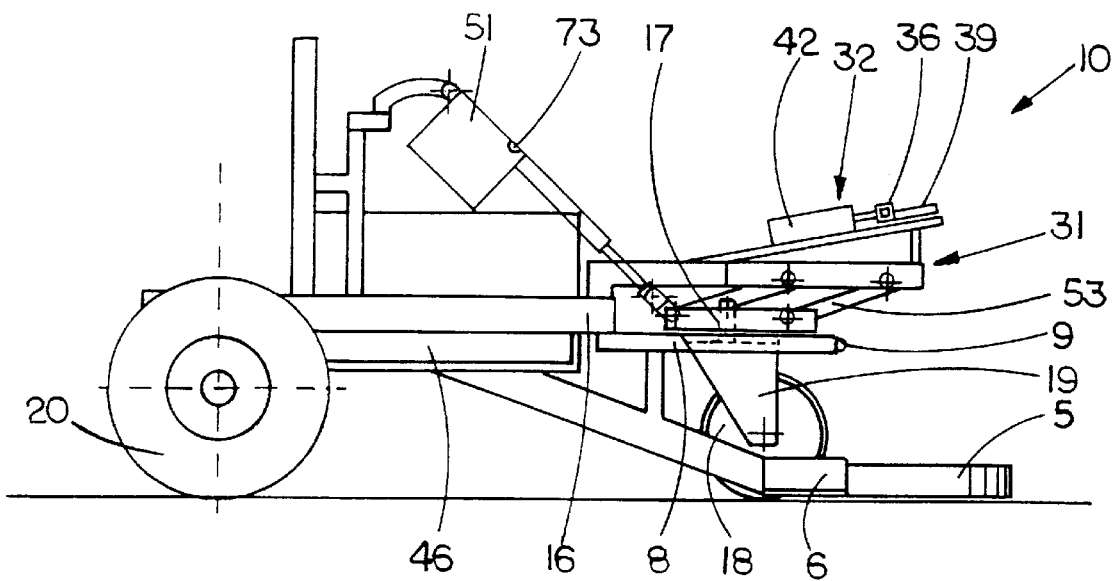
FIG. 4 is a side view, schematic illustration of the transit vehicle of FIG. 1, in the lowered position of FIG. 3.
Figure 5:
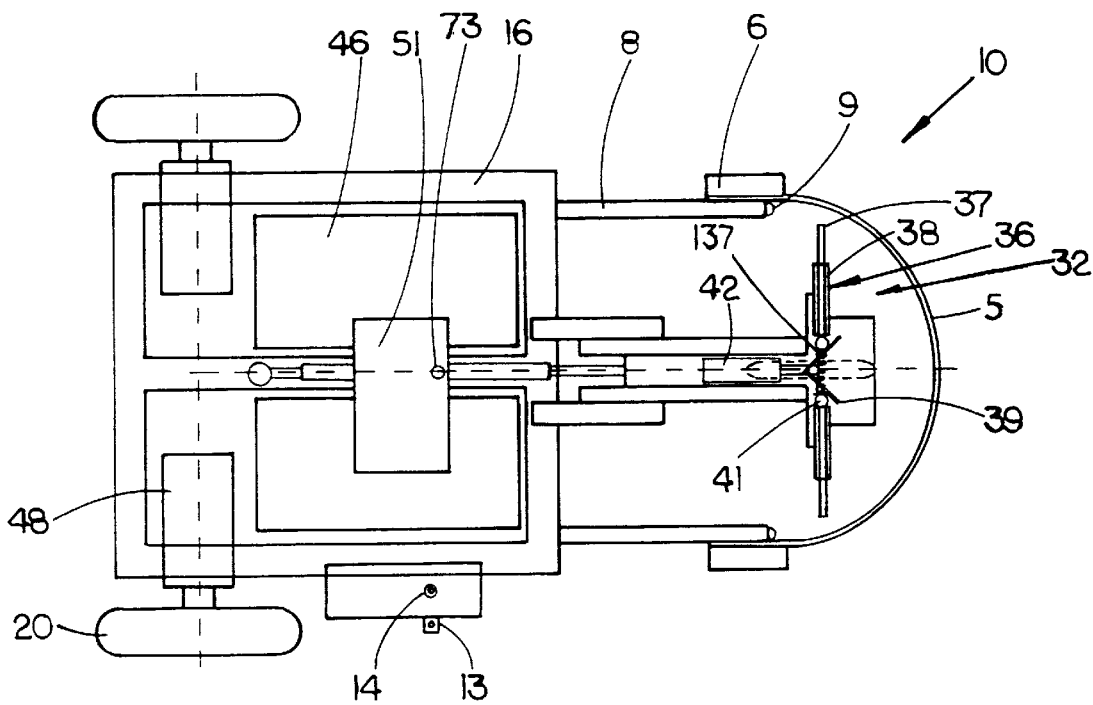
FIG. 5 is a top view, partly cutaway, schematic illustration of the transit vehicle of FIG. 1, in a gripping position of the wheelchair.
Figure 6:
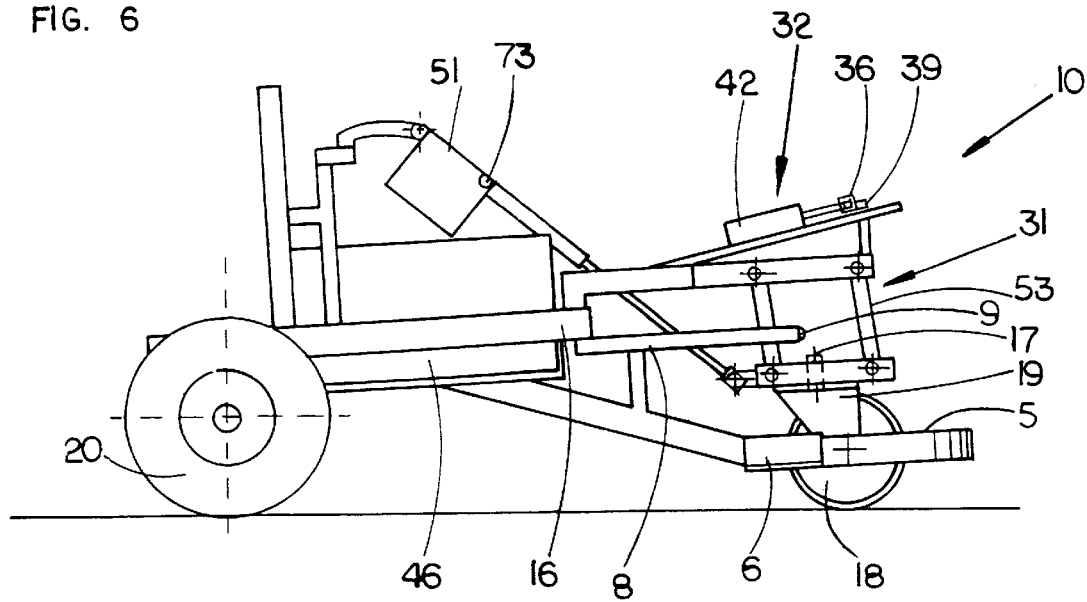
FIG. 6 is a side view, schematic illustration of the transit vehicle of FIG. 1, in the gripping position of FIG. 5.

FIGS. 3 and 4 schematically illustrate a partly cutaway top and side views, respectively, of transit vehicle 10 approaching wheelchair 22 before gripping the wheelchair as shown in FIGS. 1 and 2. In a preferred embodiment of the present invention, grip mechanisms 32 include respective grippers 36 comprising at least one horizontal extendible bar, such as bars 37, that may be retractably extended laterally toward the opposed sides into a gripping position. Bars 37 are adapted to securely grip respective niches or apertures, such as connection corners between poles 26 and beams 27, as described in detail below. As vehicle 10 approaches wheelchair 22, grippers 36 of grip mechanisms 32 are preferably aligned with respective corners between poles 26 and beams 27, so as to grip support structure 40 upon contact therewith, when grippers 36 are laterally extended. In a preferable embodiment, bars 37 are reciprocated through guiding sleeves 38 that are attached to chassis 16. Spring means (not shown) keep bars 37 in a retracted configuration as in FIGS. 3–4. When a V-shaped spacer 39 is forced between bars 37 so that the broader portion of spacer 39 urges bars 37 apart from one another, bars 37 are guided by sleeves 38 to extend laterally toward the sides, as best seen in FIGS. 2 and 5. In this combination, it is an invaluable practice to install some friction reducing means between spacer 39 and bars 37. For example, small wheels 41 may be mounted on the internal ends of bars 37 in engagement with spacer 39, in order to eliminate or reduce dramatically the friction between spacer 39 and bars 37. The movement of spacer 39 may be effected by means of an electric (or hydraulic) piston cylinder unit 42, that is preferably controlled by lift switch 13 or by a separate switch. Switch 13 controls the lifting and lowering of wheelchair 22, and for obvious safety objectives, its activation will firstly generated the extending of grippers 36, and only then— when wheelchair 22 is securely locked by grippers 36, its lifting will be allowed. Correspondingly, the retracting of grippers 36 will be allowed only after wheelchair 22 is fully lowered. In an alternate embodiment (not shown), spacer 39 may be retractably moved and locked manually. Grip mechanisms 32 and unit 42 may be covered by covering 43 for safety and esthetics objectives. Unit 51, batteries 46, motors 48 and parts of chassis 16, may be also covered by covering 3 for similar objectives.

The lifting and lowering of wheelchair 22 is effected by means of a lift mechanism such as mechanism 31. Mechanism 31 comprises a piston-cylinder unit 51 that is mounted on the chassis 16 and is operated to retractably move at least one freely rotatable support wheel 18. At least one connecting rod 53 is hinged to chassis 16 on the one hand and to support wheel 18 on the other end, so that the moving forward (as in FIGS. 1, 5 and 6) and the retracting (as in FIGS. 3–4) of support wheel 18 by means of piston cylinder unit 51 tilts up or down, respectively, the front part of chassis 16 (and the front of vehicle 10 altogether) and thus lifts or lowers, respectively, wheelchair 22 that is supported by the vehicle 10 as further explained below.

Vehicle 10 further comprises lifting platforms 6 on which rear wheels 24 of wheelchair 22 are placed prior to lifting. Platforms 6 are rigidly secured to the frontal section of chassis 16 and therefore are tilted, lifted and lowered together with chassis 16. Before the lifting of wheelchair 22, chassis 16 is lowered to its "ready to embark" configuration by which platforms 6 engage the ground (FIGS. 3–4). Wheels 24 are either rolled on board by person 30, using handles 23, or by other person maneuvering wheelchair 22, so that wheels 24 engage their place on platforms 6. It is also possible to forcibly insert platforms 6 in their lowered position between braked wheels 24 and the ground, taking advantage of the thinness of the flat platforms 6 and the propelling power provided by motors 48. It will be appreciated that the holding of wheelchair 22 by means of platforms 6 on the one hand and grip mechanisms 32 on the other hand, provides a secure and unobstructed lift of wheelchair 22. In order to eliminate possible slippage of wheelchair 22, arms 8 extend forward to provide stop and support means to poles 26. The supporting shoulders of arms 8 may be padded by suitable linings 9. In order to facilitate the guiding of vehicle 10 and wheelchair 22 into the appropriate positioning relative to one another as required for the lifting, a frontal extending guide arch 5 may be mounted to platforms 6 and help direct wheels 24 to platforms 6 by providing a restraint to any other positioning. Similarly, arms 8 may provide a guiding and impeding obstruction at the upper section of vehicle 10.

In some preferred embodiments of the present invention, vehicle 10 further includes a position detector 73, such as a microswitch, which detects the position of rods 53 and prevents activation of motors 48 when mechanism 31 is in the generally lowered position. Once motors 48 are activated, mechanism 31 can be pivoted to the generally lowered position. This optional safety feature is designed to ensure that vehicle 10 will not, by mistake, be initially driven with platforms 6 engaging the ground unless so explicitly desired.

The operation of transit vehicle 10 is described above in conjunction with wheelchair 22 by way of example only. It should be appreciated that by suitable modifications of grip mechanisms 32, or lift mechanism 31, transit vehicle 10 can be adapted for transporting any other wheeled object, for example a shopping cart. Such modifications of mechanisms 31 or 32 may include, for example, adjustment of the shape and/or dimensions and/or location and/or position of grippers 36 or platforms 6 so as to conform to a preselected element of the wheeled object.

It will be appreciated by persons skilled in the art that the present invention is not limited to what has been thus far described. Rather, the scope of the present invention is defined only by the claims which follow.

What is claimed is:

1. A powered transit vehicle operable by a person positioned in the rear of the vehicle, for transporting a wheelchair accommodating an occupant while being transported by the transit vehicle without requiring active cooperation of said occupant, the wheelchair being of the kind having a plurality of ground-interfacing wheels and a rigid support structure, the transit vehicle comprises:

(a) at least one driving wheel adapted to engage the ground and at least one motor which powers at least said driving wheel; and (b) a frontal lift mechanism adapted to lift said wheelchair by a secure grip of at least one segment of said support structure such that the wheelchair is maintained at a lifted transit position in which all the ground-interfacing wheels do not engage the ground, said lift mechanism comprises:

i. a piston-cylinder unit that is mounted on the chassis of the transit vehicle and is operable to retractably move at least one freely rotatable support wheel, at least one connecting rod having opposing first and second ends, wherein said first end of said connecting rod is hingedely coupled to said chassis and the second end of said connecting rod is hingedly coupled to said support wheel, so that the moving forward and the retracting of said support wheel by means of said piston-cylinder unit tilts up or down, respectively, the front part of said chassis and lifts or lowers, respectively, the wheelchair; and ii. a grip mechanism having at least one horizontal extendible bar, laterally extendable from a retracted position into a gripping position adapted to securely grip a respective niche or aperture of the support structure of the wheelchair.

2. A powered transit vehicle as in claim 1, wherein said lift mechanism further comprises lifting platforms on which wheels of the wheelchair are placed during the lift of the wheelchair.

3. A powered transit vehicle as in claim 1, wherein said lift mechanism further comprises a frontal extending guide arch.

4. A powered transit vehicle as in claim 1, wherein said lift mechanism further comprises arms that extend forward to provide stop and support means to the wheelchair.

5. A powered transit vehicle as in claim 1, wherein said niche or aperture includes a connection corner between poles and beams of said support structure.

6. A powder transit vehicle as in claim 1, wherein said horizontal extendible bar comprises two horizontal extendible bars extendable from a retracted position into a gripping position.

7. A transit vehicle according to claim 1 wherein said wheelchair comprises a collapsible wheelchair.

8. A powered transit vehicle operable by one person for transporting a wheelchair that may be accommodating another person while being transported with the transit vehicle, the wheelchair being of the kind having a plurality of ground-interfacing wheels and a rigid support structure, the transit vehicle comprises:

(a) at least one driving wheel adapted to engage the ground and at least one motor which powers at least said driving wheel; and (b) a lift mechanism adapted to lift said wheelchair by a secure grip of at least one segment of said support structure such that the wheelchair is maintained at a lifted transit position in which all the ground-interfacing wheels do not engage the ground, said lift mechanism comprises:

i. a piston-cylinder unit that is mounted on the chassis of the transit vehicle and is operable to retractably move at least one rotatable support wheel, at least one connecting rod having opposing first and second ends, wherein said first end of said connecting rod is hingedly coupled to said chassis and said second end is hingedly coupled to said support wheel, so that the moving forward and the retracting of said support wheel by means of said piston-cylinder unit tilts up or down, respectively, the front part of said chassis and lifts or lowers, respectively, the wheelchair; and ii. a grip mechanism having at least one horizontal extendible bar, laterally extendable from a retracted position into a gripping position adapted to securely grip respective niche or aperture of the support structure of the wheelchair, said at least one horizontal extendible bar is reciprocated through a guiding sleeve that is attached to the chassis of the transit vehicle, said grip mechanism further comprises spring means for keeping said horizontal extendible bar in a retracted configuration, and a spacer which is selectively forced to urge said horizontal extendible bar to extend to the side, by manual means or another piston-cylinder unit.

* * * * *